(12) United States Patent
Yamamoto et al.

(10) Patent No.: US 8,296,219 B2
(45) Date of Patent: Oct. 23, 2012

(54) TRANSACTION MANAGEMENT DEVICE AND READABLE STORAGE MEDIUM

(75) Inventors: Hisatoshi Yamamoto, Tokyo (JP); Hitoshi Aiba, Tokyo (JP)

(73) Assignee: Money Square Japan Inc., Tokyo (JP)

( * ) Notice: Subject to any disclaimer, the term of this patent is extended or adjusted under 35 U.S.C. 154(b) by 160 days.

(21) Appl. No.: 12/810,077

(22) PCT Filed: Aug. 27, 2009

(86) PCT No.: PCT/JP2009/064926
§ 371 (c)(1),
(2), (4) Date: Jun. 22, 2010

(87) PCT Pub. No.: WO2010/024316
PCT Pub. Date: Mar. 4, 2010

(65) Prior Publication Data
US 2010/0274704 A1   Oct. 28, 2010

(30) Foreign Application Priority Data

Aug. 28, 2008   (JP) .................................. 2008-219816

(51) Int. Cl.
*G06Q 40/00* (2012.01)
(52) U.S. Cl. ........................................ 705/37; 705/36 R
(58) Field of Classification Search .................. 705/36 R
See application file for complete search history.

(56) References Cited

U.S. PATENT DOCUMENTS 5,297,031 A * 3/1994 Gutterman et al. ............. 705/37
5,873,071 A * 2/1999 Ferstenberg et al. ....... 705/36 R (Continued)

FOREIGN PATENT DOCUMENTS

JP   2002-183446   6/2002

(Continued)

OTHER PUBLICATIONS

PCT International Preliminary Report on Patentability PCT/IB/373, issued Apr. 12, 2011, for corresponding PCT application PCT/JP2009/64926.

(Continued)

*Primary Examiner* — William Rankins
(74) *Attorney, Agent, or Firm* — Staas & Halsey LLP

(57) ABSTRACT

A transaction management device can executed, with a simple procedure, a plurality of if-done orders in parallel and can reduce the risk of the client. In the transaction management device, an order receiving unit receives buy and sell order application information from client terminals. An order information generation unit generates a plurality of order information groups for each of the items of the buy and sell order application information received by the order receiving unit, the order information groups each including: a first order for placing one of a buy order or a sell order at a first order price; a second order for placing the other one of the buy or the sell order at a second order price; and a stop order for placing the other one of the buy order or the sell order at the stop order price. The first order price, the second order price, and the stop order price are set to different values for each of the order information groups. A storage unit stores the order information groups generated in the order information generation unit. An execution information generation unit, when starting transaction processing corresponding to each of the order information groups, sets the first order to be valid, the second order to be invalid, and the stop order to be invalid.

9 Claims, 12 Drawing Sheets

U.S. PATENT DOCUMENTS

| | | | |
|---|---|---|---|
| 6,421,653 B1* | 7/2002 | May | 705/36 R |
| 6,556,976 B1* | 4/2003 | Callen | 705/37 |
| 6,985,883 B1* | 1/2006 | Togher et al. | 705/37 |
| 7,130,823 B1* | 10/2006 | Rayner et al. | 705/37 |
| 7,340,430 B2* | 3/2008 | Mulinder et al. | 705/37 |
| 7,428,508 B2* | 9/2008 | Glinberg et al. | 705/37 |
| 7,529,704 B1* | 5/2009 | Breslow et al. | 705/37 |
| 7,571,136 B2* | 8/2009 | May | 705/37 |
| 7,945,506 B2* | 5/2011 | Demirjian | 705/37 |
| 8,055,567 B2* | 11/2011 | Glinberg et al. | 705/36 R |
| 8,073,754 B2* | 12/2011 | Glinberg et al. | 705/35 |
| 8,073,764 B2* | 12/2011 | Glinberg et al. | 705/37 |
| 2005/0203840 A1* | 9/2005 | Robles | 705/39 |
| 2006/0069639 A1* | 3/2006 | Kalt | 705/37 |
| 2006/0080215 A1* | 4/2006 | Warsaw et al. | 705/37 |
| 2006/0106707 A1* | 5/2006 | Shetty et al. | 705/37 |
| 2007/0061233 A1* | 3/2007 | Jovanovic et al. | 705/36 R |
| 2007/0061241 A1* | 3/2007 | Jovanovic et al. | 705/37 |
| 2008/0288390 A1* | 11/2008 | Maynard | 705/37 |
| 2010/0306133 A1* | 12/2010 | Johnston et al. | 705/36 R |
| 2011/0145134 A1* | 6/2011 | Bandman et al. | 705/37 |
| 2011/0161221 A1* | 6/2011 | Yamamoto et al. | 705/37 |
| 2012/0030090 A1* | 2/2012 | Johnston et al. | 705/37 |
| 2012/0041896 A1* | 2/2012 | Johnston et al. | 705/36 R |

FOREIGN PATENT DOCUMENTS

| | | |
|---|---|---|
| JP | 2004-234343 | 8/2004 |
| JP | 2006-99787 | 4/2006 |
| JP | 2008-9562 | 1/2008 |
| JP | 2008-40689 | 2/2008 |
| JP | 2008-130002 | 6/2008 |
| JP | 2009-151434 | 7/2009 |

OTHER PUBLICATIONS

English Translation of Written Opinion of the International Searching Authority, PCT/ISA/237, for corresponding PCT application PCT/JP2009/64926.

Kabushiki Kaisha Mane Sukuwea Japan, "iFX Style Sosa Guide $2^{nd}$ Edition", Feb. 28, 2007, (Internet Archive ga Hozon shita Hi wa, Feb. 24, 2007, pp. 32-47.

International Search Report mailed Sep. 29, 2009 in corresponding PCT Application No. PCT/JP2009/064926.

Japanese Office Action issued May 8, 2012 in related Japanese Patent Application No. 2010-544150 (4 pages) (English Translation, 4 pages).

Office Action issued Apr. 17, 2012 in related U.S. Appl. No. 12/937,464 (9 pages).

U.S. Appl. No. 12/937,464, filed Oct. 12, 2010, Yamamoto, Hisatoshi, Money Square Japan Inc.

\* cited by examiner

FIG.2A (a) ORDER TABLE FIELD DEFINITION 181

| No | FIELD NAME | TYPE | RECORD LENGTH | NOT NULL | DEFAULT VALUE | NOTE |
|---|---|---|---|---|---|---|
| 1 | ord_seq | int8 | 8 | NOT NULL | | ORDER NUMBER |
| 2 | cust_seq | int8 | 8 | NOT NULL | | CUSTOMER NUMBER |
| 3 | style_id | int4 | 4 | NOT NULL | | PRODUCT NAME |
| 4 | ccy_pair_id | int4 | 4 | NOT NULL | | CURRENCY PAIR ID |
| 5 | ord_amnt | numeric | 6,553,565,531 | NOT NULL | | ORDER AMOUNT |
| 6 | ord_time | timestamp | 8 | NOT NULL | | ORDERED TIME |
| 7 | buy_sell_id | int4 | 4 | NOT NULL | | BUY/SELL |
| 8 | ord_rate | numeric | 6,553,565,531 | NOT NULL | | PRICE ON ORDER |
| 9 | limit_time | timestamp | 8 | NOT NULL | | TIME LIMIT OF ORDER |
| 10 | ord_cond | int4 | 4 | NOT NULL | 0 | TYPE OF ORDER |
| 11 | ifd_ord_seq | int8 | 8 | NOT NULL | | IFD ORDER NUMBER |
| 12 | repeat_flag | int4 | 4 | NOT NULL | | REPEAT ORDER FLAG |
| 13 | new_close | int4 | 4 | NOT NULL | | NEW/SETTLEMENT |

FIG.2B (b) CUSTOMER ACCOUNT INFORMATION TABLE FIELD DEFINITION — 182

| No | FIELD NAME | TYPE | LENGTH | NOT NULL | DEFAULT VALUE | NOTE |
|----|------------|------|--------|----------|---------------|------|
| 1 | acc_seq | int8 | 8 | NOT NULL | | ACCOUNT RECORD NUMBER |
| 2 | rsrv_time | timestamp | 8 | NOT NULL | | RESERVED DATE AND TIME |
| 3 | acpt_time | timestamp | 8 | NOT NULL | | CONFIRMED DATA AND TIME |
| 4 | cust_seq | int8 | 8 | NOT NULL | | CUSTOMER NUMBER |
| 5 | ccy_id | bpchar | 3 | NOT NULL | | CURRENCY ID |
| 6 | acc_head_id | int4 | 4 | NOT NULL | | ACCOUNT RECORD TYPE |
| 7 | amnt | numeric | 6,553,565,531 | NOT NULL | | AMOUNT |
| 8 | remark | varchar | 128 | | | REMARK |
| 9 | dw_flg | int4 | 4 | NOT NULL | | ACCOUNT ACTIVITY DISTINCTION FLAG — 182a |

FIG.2C (c) CURRENCY PAIR ORDER REQUIREMENT TABLE FIELD DEFINITION 183

| No | FIELD NAME | TYPE | LENGTH | NOT NULL | DEFAULT VALUE | NOTE |
|---|---|---|---|---|---|---|
| 1 | ccy_pair_id | int4 | 4 | NOT NULL | | CURRENCY PAIR ID |
| 2 | base_ccy_id | bpchar | 3 | NOT NULL | | BASE CURRENCY ID |
| 3 | fix_ccy_id | bpchar | 3 | NOT NULL | | KEY CURRENCY ID |
| 4 | trd_unit | int4 | 4 | NOT NULL | | TRANSACTION AMOUNT |
| 5 | marg_ratio | numeric | 6,553,565,531 | NOT NULL | | MARGIN MONEY RATIO |
| 6 | trd_cost | numeric | 6,553,565,531 | NOT NULL | | TRANSACTIONS COST |
| 7 | trap_range | numeric | 6,553,565,531 | NOT NULL | | TRAP TRADE PRICE RANGE |
| 8 | point_num | int4 | 4 | | | NUMBER OF DECIMALS |
| 9 | delv_amnt | int4 | 4 | | | DELIVERED AMOUNT |
| 10 | max_mkt_cng_price | numeric | 6,553,565,531 | NOT NULL | | PRICE RANGE OF MARKET ORDER |
| 11 | min_price_rng | numeric | 6,553,565,531 | NOT NULL | | MINIMUM VALUE OF SETTLEMENT PRICE RANGE |
| 12 | mkt_trd_cost | numeric | 6,553,565,531 | | | COST OF MARKET TRANSACTION |

FIG.5A

| ORDER TYPE | BUY/SELL | ORDER CONDITION | ORDER PRICE | ORDER AMOUNT |
|---|---|---|---|---|
| NEW | BUY | LIMIT | 107.00 | 100,000 |
| NEW | BUY | LIMIT | 106.00 | 100,000 |
| NEW | BUY | LIMIT | 105.00 | 100,000 |
| NEW | BUY | LIMIT | 104.00 | 100,000 |
| NEW | BUY | LIMIT | 103.00 | 100,000 |

USD/JPY  LIMIT  STOP LOSS

BUYING TRAP TRADE ®

- START PRICE: 107.00 — 40a
- iFx Style: pro — 40b
- ORDER AMOUNT: 10 X TEN THOUSAND YEN (CURRENCY)
- TRAP PRICE RANGE: 1.00 YEN — 40c
- TRAP NUMBER: 5 — 40d
- PROFIT AMOUNT DESIGNATION: ☑ 5.0 X TEN THOUSAND YEN — 40e
- STOP LOSS PRICE: 102.50 — 40f
- EXPIRATION DATE: INDEFINITE PERIOD — 40g
- REPEAT IFD: ☑

40h — ORDER CONFIRMATION  CLOSE — 40j

ATTENTION: Order cannot be received when it is too near to the buying price.

FIG.5B

USD/JPY

BUYING TRAP TRADE ®

| | |
|---|---|
| START PRICE | 107.00 |
| iFx Style | pro |
| ORDER AMOUNT | 10 × TEN THOUSAND YEN (CURRENCY) |
| TRAP PRICE RANGE | 1.00 YEN |
| TRAP NUMBER | 5 |
| PROFIT AMOUNT DESIGNATION | 5.0 × TEN THOUSAND YEN |
| STOP LOSS PRICE | 102.50 |
| REPEAT IFD | DESIGNATED |
| EXPIRATION DATE | INDEFINITE PERIOD |

41a — [ORDER] [RETURN]

NECESSARY AMOUNT OF MARGIN MONEY  3,152,100 YEN

ATTENTION: Repeat-IFD (RIFD) repeats orders until it is cancelled, and canceled when the necessary margin money lacks.

| ORDER TYPE | BUY/SELL | ORDER CONDITION | ORDER PRICE | ORDER AMOUNT |
|---|---|---|---|---|
| NEW | BUY | LIMIT | 98.00 | 100,000 |
| SETTLEMENT | SELL | LIMIT | 98.64 | 100,000 |
| SETTLEMENT | SELL | STOP LOSS | 96.00 | 100,000 |
| NEW | BUY | LIMIT | 97.90 | 100,000 |
| SETTLEMENT | SELL | LIMIT | 98.54 | 100,000 |
| SETTLEMENT | SELL | STOP LOSS | 96.00 | 100,000 |
| NEW | BUY | LIMIT | 97.80 | 100,000 |
| SETTLEMENT | SELL | LIMIT | 98.44 | 100,000 |
| SETTLEMENT | SELL | STOP LOSS | 96.00 | 100,000 |
| NEW | BUY | LIMIT | 97.70 | 100,000 |
| SETTLEMENT | SELL | LIMIT | 98.34 | 100,000 |
| SETTLEMENT | SELL | STOP LOSS | 96.00 | 100,000 |
| NEW | BUY | LIMIT | 97.60 | 100,000 |
| SETTLEMENT | SELL | LIMIT | 98.24 | 100,000 |
| SETTLEMENT | SELL | STOP LOSS | 96.00 | 100,000 |

USD/JPY

TRAP REPEAT IF DONE ORDER® ANOTHER ORDER

| | |
|---|---|
| ORDER TYPE | NEW |
| BUY/SELL | BUY — 40k |
| ORDER CONDITION | LIMIT — 40m |
| iFX Style | pro — 40b |
| ORDER AMOUNT | 10 X TEN THOUSAND YEN (CURRENCY) |
| START PRICE | 98.00 — 40a |
| TRAP NUMBER | 5 — 40d |
| TRAP PRICE RANGE | 0.10 YEN — 40c |
| PROFIT AMOUNT DESIGNATION | 50000 YEN — 40e |
| EXPIRATION DATE | INDEFINITE PERIOD — 40n |
| STOP LOSS PRICE | ☑ 96.00 — 40f |

40h — NEXT  CLOSE — 40j

ATTENTION: When requesting a pair of new stop loss order and settlement limit order as trap-repeat-if-done-order, repeated order is set to a pair of new limit order and settlement limit order.
ATTENTION: Trap-repeat-if-done-order generally repeats the same orders automatically, successively and everlastingly until cancelled.

FIG.6

The state of recorded and the displayed screen of limit order when the trap-repeat-if-done-order is requested (Example)

181

| ORDER NUMBER | CUSTOMER NUMBER | CURRENCY PAIR | ORDER AMOUNT | ORDERED TIME | BUY/SELL | ORDER PRICE | TIME LIMIT OF ORDER | ORDER TYPE | NEW/SETTLEMENT |
|---|---|---|---|---|---|---|---|---|---|
| 1000 | 9999 | USD/JPY | 100000 | 2008.7.22 23:00 | BUY | 107.0 | 2999.12.31 23:59 | TRAP REPEAT IFD | NEW |
| 1001 | 9999 | USD/JPY | 100000 | 2008.7.22 23:00 | SELL | 107.5 | 2999.12.31 23:59 | TRAP REPEAT IFD | SETTLEMENT |
| 1002 | 9999 | USD/JPY | 100000 | 2008.7.22 23:00 | SELL | 102.5 | 2999.12.31 23:59 | TRAP REPEAT IFD | SETTLEMENT |
| 1003 | 9999 | USD/JPY | 100000 | 2008.7.22 23:00 | BUY | 106.0 | 2999.12.31 23:59 | TRAP REPEAT IFD | NEW |
| 1004 | 9999 | USD/JPY | 100000 | 2008.7.22 23:00 | SELL | 106.5 | 2999.12.31 23:59 | TRAP REPEAT IFD | SETTLEMENT |
| 1005 | 9999 | USD/JPY | 100000 | 2008.7.22 23:00 | SELL | 102.5 | 2999.12.31 23:59 | TRAP REPEAT IFD | SETTLEMENT |
| 1006 | 9999 | USD/JPY | 100000 | 2008.7.22 23:00 | BUY | 105.0 | 2999.12.31 23:59 | TRAP REPEAT IFD | NEW |
| 1007 | 9999 | USD/JPY | 100000 | 2008.7.22 23:00 | SELL | 105.5 | 2999.12.31 23:59 | TRAP REPEAT IFD | SETTLEMENT |
| 1008 | 9999 | USD/JPY | 100000 | 2008.7.22 23:00 | SELL | 102.5 | 2999.12.31 23:59 | TRAP REPEAT IFD | SETTLEMENT |
| 1009 | 9999 | USD/JPY | 100000 | 2008.7.22 23:00 | BUY | 104.0 | 2999.12.31 23:59 | TRAP REPEAT IFD | NEW |
| 1010 | 9999 | USD/JPY | 100000 | 2008.7.22 23:00 | SELL | 104.5 | 2999.12.31 23:59 | TRAP REPEAT IFD | SETTLEMENT |
| 1011 | 9999 | USD/JPY | 100000 | 2008.7.22 23:00 | SELL | 102.5 | 2999.12.31 23:59 | TRAP REPEAT IFD | SETTLEMENT |
| 1012 | 9999 | USD/JPY | 100000 | 2008.7.22 23:00 | BUY | 103.0 | 2999.12.31 23:59 | TRAP REPEAT IFD | NEW |
| 1013 | 9999 | USD/JPY | 100000 | 2008.7.22 23:00 | SELL | 103.5 | 2999.12.31 23:59 | TRAP REPEAT IFD | SETTLEMENT |
| 1014 | 9999 | USD/JPY | 100000 | 2008.7.22 23:00 | SELL | 102.5 | 2999.12.31 23:59 | TRAP REPEAT IFD | SETTLEMENT |

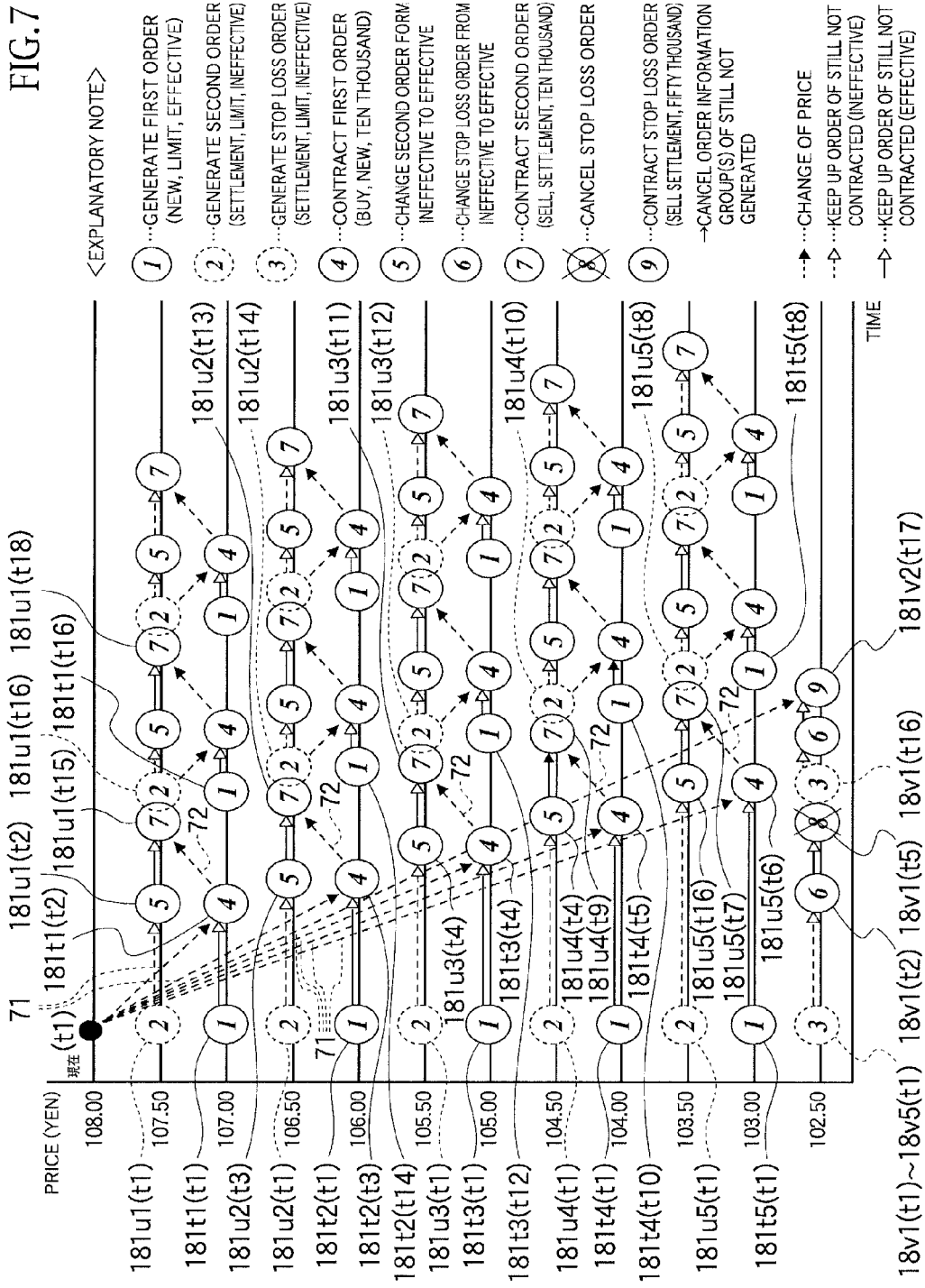

TRANSACTION MANAGEMENT DEVICE AND READABLE STORAGE MEDIUM

This application is a National Stage application under 35 USC 371 of International Application PCT/JP2009/064926, filed Aug. 27, 2009, and which claims priority to Japanese application 2008-219816, filed Aug. 28, 2008, and which are incorporated herein by reference in their entireties.

TECHNICAL FIELD

The present invention relates to an art for performing the management and the support of the transaction. The present invention can be applied to a device for managing and supporting the transaction of the foreign exchange or other kinds of the financial products, for example.

BACKGROUND ART

The market order and the limit order are known as transaction methods for the financial product, for example, the foreign exchange. The market order means the order form in which the dealer performs the transaction by the price at the time the customer executes an order. The limit order means the order form in which the customer designates the trade price in advance and the dealer performs the transaction when the market price is equal to the designated trade price. In other words, the dealer who receives the limit order buys the corresponding financial product when the price of it falls to the designated price or sells the corresponding financial product when the price of it rises to the designated price. The invention for performing the limit orders of the financial products using a computer is previously known (described in the patent document 1, for example).

PRIOR ART DOCUMENT

Patent Document

Patent Document 1: JP2006-99787A

SUMMARY OF THE INVENTION

Problems to be Solved by the Invention

However, the prices of the financial products fluctuates irregularly at any time, and so it is substantially impossible to project them exactly. For example, when performing the limit order, there is a case that the price of the financial product falls near to the price designated in advance but turn to rise without reaching the designated price. In reverse, there is a case that the price of the financial product rises near to the price designated in advance but turn to fall without reaching the designated price. Moreover, there is a case that the price of the financial product falls and becomes lower than the price designated in advance. In reverse, there is a case that the price of the financial product rises and becomes higher than the price designated in advance. In these cases, there is a possibility that the customer will suffer substantial loss. However, the invention disclosed in the above described patent document 1 cannot avoid such a loss.

In many cases, the if-done-orders are performed as the limit orders of the financial products. The if-done-order means the order form in which two transactions being provided with different positions are ordered at the same time. When the if-done-order is executed, firstly the deal in connection with the order of the higher position (corresponding to one of 'buy' and 'sell', hereinafter called 'first order') is done, then, the order of the lower position (corresponding to the other of 'buy' and 'sell', hereinafter called 'second order') is automatically set to be effective. However, the invention disclosed in the above described patent document 1 cannot manage the limit order of the if-done-order. In the present application, the 'effectiveness' of the order means the state in which the processing based on the order is in execution, and 'ineffectiveness' of the order means the state in which the processing based on the order is not in execution.

There is a case that one customer executes plural if-done-orders (i.e. plural pairs of the first and second orders) in connection with the same financial product. However, in the invention of the patent document 1, the customer needs to execute these if-done-orders individually by different operations, so the procedures of the order are complex.

There is a case that the market price of the financial product largely changes compared with that of conventional market and the restoration cannot be expected for some time. In this case, there is a possibility that the dealer may desire to sell the financial product for minimizing loss. However, the invention of the patent document 1 cannot sell the financial products bought using the limit order automatically, even if the market price of the financial product is changed. In addition, the invention of the patent document 1 cannot stop the if-done-order automatically, even if the market price of the financial product largely changes.

The first purpose of the present invention is to provide an art for executing plural if-done-orders in parallel with simple operations. In addition, the second purpose of the present invention is to provide an art for stopping the if-done-orders automatically in response to the situation of market price. By achieving these purposes, the convenience of the system user can increase and risk of the system user can decrease.

Means to Solve the Problem

The transaction management device comprises an order receiving unit that receives a trade order application information from a client terminal; an order information generation unit that generates a plural order information groups, each of which contains one first order for executing one of buying or selling at a first order price, one second order for executing the other of buying or selling at a second order price and one stop loss order at executing the other of buying or selling for a stop loss order price, by each trade order application information received in the order receiving unit and sets the first order price, the second order price and the stop loss order price to different prices by each order information group; a memory unit that stores the order information groups generated in the order information generation unit; and a contract information generation unit that sets the first order to be effective, the second order to be ineffective and the stop loss order to be ineffective when the transaction processing corresponding to one of order information groups starts.

According to the transaction management device, when one of the first order is executed, the contract information generation unit sets the second order and the stop loss order corresponding to the contracted first order to be effective.

According to the transaction management device, after the second order contained in one of the order information group is executed, the contract information generation unit newly generates next order information group corresponding to the order information group of the contracted second order.

According to the transaction management device, after the stop loss order contained in one of the order information group is executed, the contract information generation means cancels subsequent generations Of all order information groups corresponding to the order information group of the contracted stop loss order.

According to the transaction management device, the order information generation means executes the first order as a new limit order, executes the second order as a settlement limit order and executes the stop loss order as a settlement stop loss order.

According to the transaction management device, the order information generation means sets the number of traded products of each order information groups generated based on the same trade order application information the same.

According to the transaction management device, the order information generation means sets the plural first order prices so that range of prices between them are uniform and sets the plural second order prices so that range of prices between them are uniform.

According to the transaction management device, when a cancellation of an order of financial product previously formed is requested, the contract information generation means extracts the order information group containing the order information corresponding to the order to which the cancellation is requested and cancels all of the order information before contract contained in the extracted order information group.

According to the transaction management device, the financial product is a foreign exchange.

The computer-readable storage medium having recorded thereon a computer program for causing a computer to operate as a transaction management device, the computer program comprising code segments of executing: an order receiving step that receives a trade order application information from the client terminal; an order information generation step that generates a plural order information groups, each of which contains one first order for executing one of buying or selling at a first order price, one second order for executing the other of buying or selling at a second order price and one stop loss order for executing the other of buying or selling at a stop loss order price, by each trade order application information received in the order receiving step and sets the first order price, the second order price and the stop loss order price to different prices by each the order information group; a storing step that stores the order information groups generated by the order information generation step; and a contract information generation step that sets the first order to be effective, the second order to be ineffective and the stop loss order to be ineffective when the transaction processing corresponding to one of order information group starts.

Effect of the Present Invention

The invention generates plural order information groups containing each of the first order, the second order and the stop loss order by each trade order application information received in the order receiving unit. Furthermore, the invention sets the first order price, the second order price and the stop loss order price to different prices by each order information group. Therefore, the invention can execute plural if-done-orders at the same time with simple operations.

The invention sets the second order and the stop loss order to be effective automatically when the first order is executed. Therefore, the operation of the customer is simple.

The invention newly generates a next order information group corresponding to the order information group of a contracted second order after the second order contained in one of the order information group is executed. Therefore, repeat-if-done-order is executed automatically.

The invention cancels subsequent generations of all order information groups corresponding to the order information group of a contracted stop loss order after the stop loss order contained in one of the order information group is executed. Therefore, the risk of the customer is avoided automatically when the market price is largely changed.

The invention automatically executes a new limit order, a settlement limit order and a settlement stop loss order. Therefore, the procedures of the order is simplified and the convenience of the customer increases.

The invention can simplify the order operation of the customer.

The invention an increase the risk disperse effect of the transaction.

The invention can execute the cancellation procedures quickly with simple operation.

The invention can apply the present invention to transaction of the foreign exchange.

The invention can construct the device of the present invention by the computer.

BRIEF DESCRIPTION OF THE DRAWINGS

FIG. 2A is a diagram showing field definitions of the order table stored in the transaction management device shown in FIG. 1.

FIG. 2B is a diagram showing the field definitions of the customer account information table stored in the transaction management device shown in FIG. 1.

FIG. 2C is a diagram showing the field definitions of the currency pair order requirements table stored in the transaction management device shown in FIG. 1.

FIG. 5A is a conceptual diagram showing an example of the second input screen displayed by the display unit of the client terminal.

FIG. 5B is a conceptual diagram showing the confirmation screen displayed by the display unit of the client terminal.

FIG. 5C is a conceptual diagram showing another example of the second input screen displayed by the display unit of the client terminal.

FIG. 6 is a conceptual diagram showing data recorded in the order table shown in FIG. 1.

FIG. 7 is a conceptual diagram schematically showing the procedures when the transaction management device shown in FIG. 1 executes the contract processing of the limit order based on the trap-repeat-if-done-order.

DESCRIPTION OF THE PREFERRED EMBODIMENTS

An embodiment of the present invention is described with reference to the drawings, hereinafter.

Figure 1:
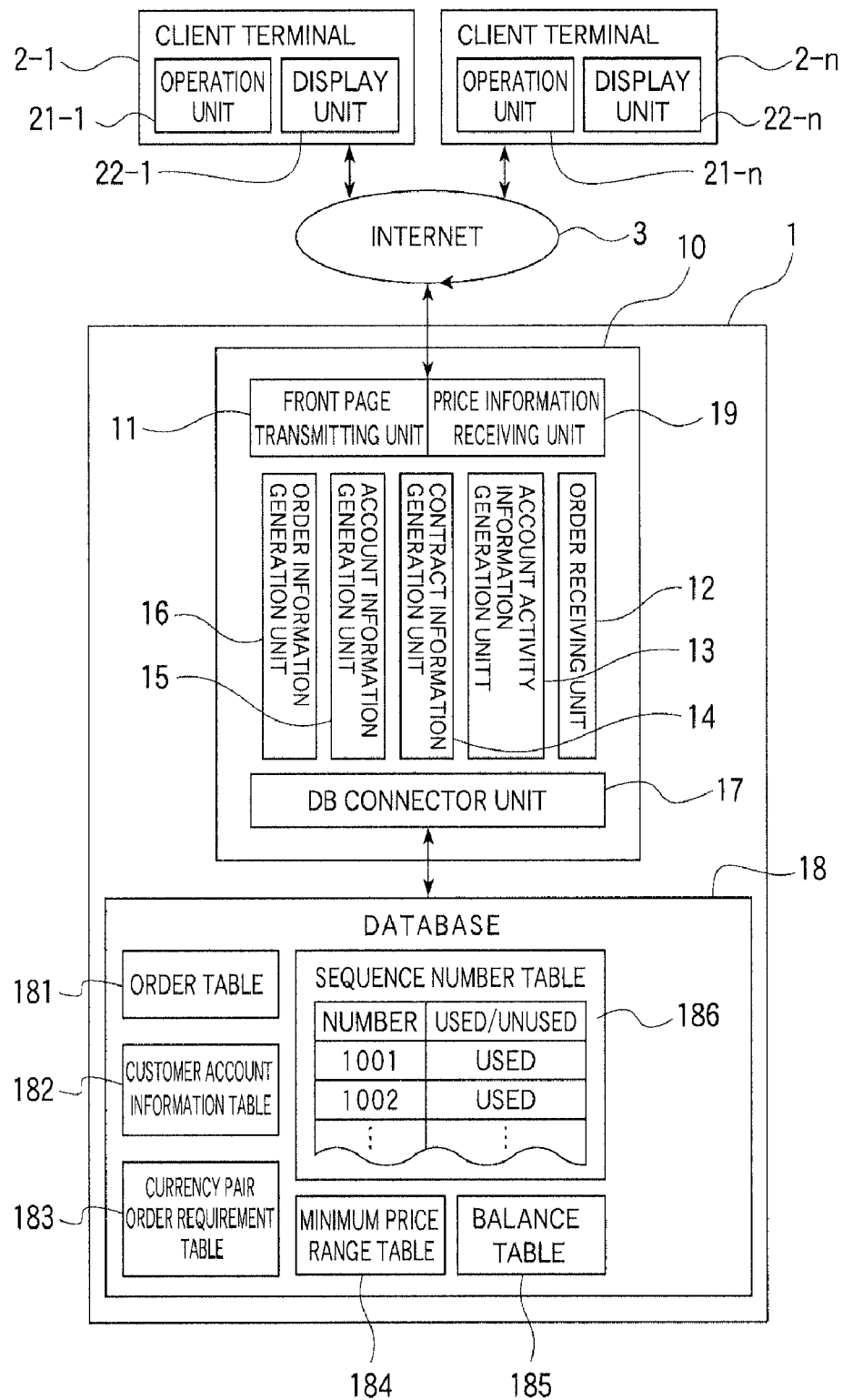
FIG. 1 is a block diagram conceptually showing the structure of the transaction management system according to the present embodiment.

FIG. 1 is a block diagram conceptually showing the structure of the financial product transaction management system according to the present embodiment. As shown in FIG. 1, the financial product transaction management system 1A comprises a financial product transaction management device 1 and plural client terminals 2-1 to 2-n (the number of the client terminals is defined as 'n' in the present embodiment). The financial product transaction management device 1 and the client terminals 2-1 to 2-n can communicate each other via the internet 3 as a WAN (Wide Area Network). The financial product transaction management system 1A according to the present embodiment treats the foreign exchange as the financial product.

The financial product transaction management device 1 is the server computer administrated and managed by the handler of the financial product. The management device 1 comprises a function of a web server and a function of a database storing large quantities of data.

The client terminals 2-1 to 2-n are owned and used by the individuals or corporations who execute the trade of the financial product. The terminals 2-1 to 2-n are the communication terminals having the data communication functions. Personal computers, mobile phones and so on can be used as the terminals 2-1 to 2-n.

The client terminals 2-1 to 2-n comprise the operation units 21-1 to 21-n and the display units 22-1 to 22-n. The operation units 21-1 to 21-n are, for example, computer mice, keyboards etc. and used for inputting various kinds of instructions by the users. The display units 22-1 to 22-n display various kinds of the instructions input from the operation units 21-1 to 21-n and various kinds of pictures. Each structure of the client terminals 2-1 to 2-n, each structure of the operation units 21-1 to 21-n and each structure of the display units 22-1 to 22-n are the same. Therefore, they are described as the client terminal 2, the operation unit 21 and the display unit 22 hereinafter, except for the case that the distinction is necessary.

While not shown in FIG. 1, the financial product transaction management device 1 comprises at least one CPU (Central Processing Unit), a RAM (Random Access Memory) used as the working area of the CPU, a ROM (Read Only Memory) storing the boot program etc., the auxiliary storage unit storing various kinds of programs and various kinds of data etc., a communication interface used for data communication and so on. The auxiliary storage unit is, for example, a hard disk storing an OS (Operation System) program, plural application programs, data of database and so on. The programs and the data stored in the hard disk realize various kinds of functions using the CPU and the hardware resources. However, these functions can be realized by only using a hardware.

As shown in FIG. 1, the financial product transaction management device 1 comprises a data processor 10 and a database 18. The data processor 10 realizes various functions using the above mentioned program and hardware resource. The database 18 stores various kinds of data which is processed by the data processor 10. The data processor 10 comprises a front page transmitting unit 11, an order receiving unit 12, an account activity information generation unit 13, a contract information generation unit 14, an account information generation unit 15, an order information generation unit 16, a database (DB) connector unit 17 and a price information receiving unit 19.

The order receiving unit 12 receives a trade order application information from the client terminal 2 and executes the process necessary for forming the orders of the financial products.

The account activity information generation unit 13 receives the request for deposit and withdrawal from the client terminal 2 and generates a list of deposit and withdrawal based on the request.

The order information generation unit 16 generates the information in connection with the formed order based on the information processed by the order receiving unit 12. The 'order' of the present embodiment contains the if-done-order in addition to the market order and the limit order.

In the present embodiment, the order information generation unit 16 generates the first order as a new limit order information, generates the second order as a settlement limit order information and generates the stop loss order as a settlement stop loss order information. By generating the first order as a new limit order information, the order method can be standardized. Consequently, the information processing of the financial product transaction management system 1A is simplified and so the structure of the system 1A is simplified. In addition, standardization of the order method simplifies the order procedure and so enhances the convenience of the customer. By generating the second order as a settlement limit order information, the profit given by the first order can be fixed by the second order. Consequently, the order procedure and the information processing of the financial product transaction management system 1A can be simplified. Because of generating the stop loss order as a settlement stop loss order, the stop loss order can be executed only when the stop loss order is necessary, that is, only when the settlement procedure for minimizing the loss of the customer is executed. Consequently, the overuse of the stop loss order is prevented and the information processing of the financial product transaction management system 1A is simplified.

The contract information generation unit 14 executes the contract processing corresponding to the order generated by the order information generation unit 16 and the processing of transmitting the information corresponding to the completed contract processing to the client terminal 2 of the customer. In the present embodiment, the 'contract' means that the transaction corresponding to the customer's order goes through. And the 'contract processing' means the procedure and the processing for going through the transaction corresponding to the customer's order.

The account information generation unit 15 has a function of generating a deposit balance information (i.e. an information for specifying the account, balance and so on) and a function of managing the generated deposit balance information as a margin money information (i.e. an information for supporting that the contract of the order can be realized). Incidentally, the margin money information is periodically compared with the actual margin money of the customer. The information corresponding to the actual margin money of the customer is provided by the bank or other finance institution.

The database connector unit 17 executes data conversions between the data format of the data processor 10 and the data format of the database 18 (for example, bi-directional conversions between the logical data structure and the physical data structure) and executes the necessary processing for communicating between the data processor 10 and the database 18.

The database 18 stores the data used by the financial product transaction management device 1. In the present embodiment, a relational database is used as the database 18. However, other kind of database (e.g. an object database) can be used if only suitable for storing large quantities of data and rewriting of the data. The database 18 stores an order table 181, a customer account information table 182, a currency pair order requirement table 183, a minimum price range table 184, a balance table 185 and a sequence number table 186. A minimum price range information is recorded into the minimum price range table 184. The minimum price range information means minimum value of difference between two selling order prices or minimum value of difference between two buying order prices. The minimum price rage information is set by kinds of the financial products. The balance table 185 stores a balance information, a standard balance information and so on. The balance information is the difference between the market price at the time and the price on order contained in the order information. The standard balance information is used as the standard value when a prohibition rule is provided. The prohibition rule means the rule for prohibiting a transaction or a cancellation of the transaction. For example, it is possible to provide a prohibition rule that a cancellation request for order information is rejected when the value of the balance information is equal to or smaller than the value of the standard balance information. The sequence numbers, which are used for distinguishing the order information described below, are written, into the sequence number table 184. Details of the order table 181, the customer account information table 182 and the currency pair order requirement table 183 are described below.

The front page transmitting unit 11 generates the display data provided by the display unit 22 of the client terminal 2 and transmits the generated display data to the client terminal 2.

The price information receiving unit 19 acquires the information concerning the price of the financial product processed by the financial product transaction management device 1. Moreover, the price information receiving unit 19 executes the processing necessary for making the data processor 10 to use the acquired information. In the present embodiment, the price information receiving unit 19 acquires information concerning the price of the foreign exchange.

FIG. 2A shows the field definitions of the order table 181, FIG. 2B shows the field definitions of the customer account information table 182 and FIG. 2C shows the field definitions of the currency pair order requirement table 183. As shown in FIGS. 2A to 2C, the tables 181, 182 and 183 have plural columns. In each of FIG. 2A to 2C, the 'field name' defines the name of the field, the 'type' defines the type of the data, for example, character, numerical value, date, hour and so on. The 'length' defines the bit length or other kind of the data length. The 'NOT NULL' defines whether a blank space is admitted, The 'default value' defines whether the default value exists. And the 'note' defines the name of data.

The financial product transaction management device 1 of the present embodiment can repeat the plural if-done-order concerning the financial products of the same kind following to the predetermined first order price and the predetermined second order price. In the present application, such order is called repeat-if-done-order. Moreover, the financial product transaction management device 1 can simultaneously execute plural kinds of repeat-if-done-order based on single trade order application (i.e. single trade order application information). In the present application, such order is called trap-repeat-if-done-order. The first order price and the second order price are different by each repeat-if-done-order.

Next, the procedures of the financial product transaction management system 1A for executing the trap-repeat-if-done-order is described.

Figure 3:
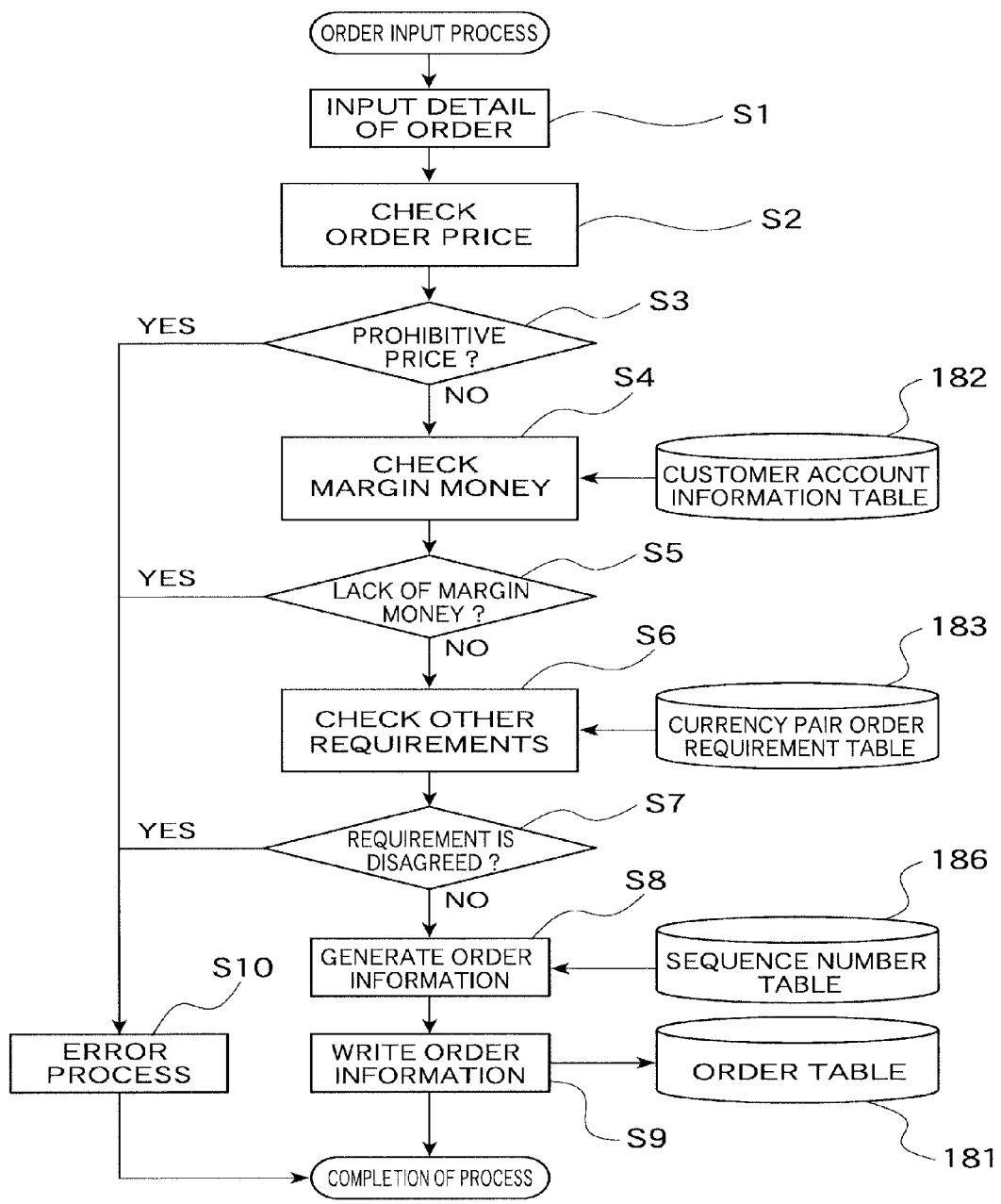
FIG. 3 is a flowchart showing the procedures when the transaction management device shown in FIG. 1 executes the trap-repeat-if-done-order.

FIG. 3 is a flowchart showing the procedures when the transaction management device 1 executes the trap-repeat-if-done-order. Hereinafter, the procedures for the ordering is described with referencing FIG. 3.

When using the financial product transaction management system 1A, the customer accesses to the financial product transaction management device 1 using the client terminal 2. The front page transmitting unit 11 of the financial product transaction management device 1 makes the display unit 22 of the client terminal 2 to display the first input screen (not shown in drawings) and the second input screen 40 (shown as the conceptual diagram in FIG. 5A).

The first input screen displays a button for selecting the currency pair corresponding to the exchange trade (the currency pair of the Japanese Yen and the US Dollar in the present embodiment), a button for selecting the trade form (distinction between 'buying' and 'selling'), a button for selecting the order form (the market order, the limit order, the limit order of the if-done-order or the stop loss order of the if-done-order), a button for selecting the expiration date of order (specified year, specified month, indefinite period and so on) and a button for fixing the selection result of these buttons. The customer clicks these buttons, namely the currency pair selection button, the trade form selection button, the order form selection button and the expiration date selection button in order. After that, the button for fixing is clicked, then, the front page transmitting unit 11 makes the display unit 22 to display the second input screen. Incidentally, the stop loss order means the buying order at the price higher than the present market price or the selling order at the price lower than the present market price. By placing the stop loss order in advance, the buying or selling can be automatically done when the exchange rate changes suddenly, and so the loss can be minimized (described below).

FIG. 5A shows an example of the second input screen 40 when the trap trade according to the present embodiment is executed. As shown in FIG. 5A, the second input screen 40 displays a start price input field 40a, an amount input field 40b, a price range input field 40c, a trap number selection field 40d, a profit amount designation field 40e, a stop loss order price input field 40f and a repeat-if-done-order selection field 40g. The start price input field 40a is the field for inputting the order basic price of the trap trade. The amount input field 40b is the field for inputting the price amount of the orders by the positions. The price range input field 40c is the field for inputting the price range between the order positions. The price range is a difference between each buying price amount of an order. The trap number selection field 40d is the field for selecting the number of the order positions. The profit amount designation field 40e is the field for inputting the profit amount by the positions. The stop loss order price input field 40f is the field for inputting the contracted price of the stop loss orders. The repeat-if-done-order selection field 40g is the field for selecting whether the repeat-if-done-order is executed. The customer sets the order using the field 40a to 40g. The example of FIG. 5A shows the state in which 107.00 yen per dollar as the start price, 1.00 yen as the price range, one hundred thousand yen as the order price by the position, 5 as the number of the order positions, 102.50 yen per dollar as the contracted price of the stop loss orders, indefinite period as the expiration date, repeat-if-done-order as the order form are set. In the case where the trap trade is executed, the trap-trade-if-done-order is selected using the repeat-if-done-order selection field 40g.

After completing the settings using the fields 40a to 40g, the customer clicks the order confirmation button 40h located at the lower part of the second input screen 40. Consequently, set data are displayed on the order information displaying field 40i of the second input screen 40 and sent from the client terminal 2 to the order receiving unit 12 of the financial product transaction management device 1 (see step S1 of FIG.

3). In the example of FIG. 5A, the input value to the trap number selection field 40*d* is '5', so five kinds of orders are displayed on the order information displaying field 40*i*. The value of the start price input field 40*a* is '107.00 yen' and the value of the price range input field 40*c* is '1.00 yen', so the order price amounts of the order information displaying field 40*i* is '107.00 yen' through '103.00 yen' and each of the differences of the order amounts is 1.00 yen. And the value of the amount input field 40*b* is 'one hundred thousand yen', so the order amount of the order information displaying field 40*i* is '100,000' yen. Incidentally, the data set by the operation described above are cancelled and the display unit 22 returns to display the initial screen when the customer clicks the 'CLOSE' button 40*j* on the second input screen 40 of FIG. 5A, not the order confirmation button 40*h*.

FIG. 5C shows another example of the second input screen 40. In FIG. 5C, some elements are assigned the same reference numbers as those of the corresponding elements in FIG. 5A. In the second input screen 40 of the FIG. 5C, the trade type input field 40*k* is the filed for inputting the distinction between 'buying' and 'selling'. The order requirement input field 40*m* is the field for inputting the distinction between the limit order and the stop loss order. The check box 40*n* is the check box for setting whether to designate the stop loss price. By using these input fields 40*k*, 40*m* and 40*n*, the distinction between the first order (i.e. 'buying' and 'limit' in the order information displaying field 40*i*), the second order (i.e. 'selling' and 'limit' in the order information displaying field 40*i*) and the stop loss order (i.e. 'selling' and 'stop loss' in the order information displaying field 40*i*) can be designated. Consequently, the customer can individually set not only the first order prices but also the second order prices and the stop loss order prices.

After executing the step S1, the screen of the display unit 22 is switched to the third input screen not shown in drawings from the second input screen 40. The order cancellation button for canceling the repeat-if-done-order is displayed on the third input screen.

Next, the order receiving unit 12 confirms the input order information. In this confirmation processing, the order method selected using the repeat-if-done-order selection field 40*g* is confirmed, additionally, the price on order of the provided data is checked (see step S2). In this check, the start price input to the start price input field 40*a* and the exchange market price received in the price information receiving unit 19 are compared. The order receiving unit 12 judges that the order price is proper only when the customer can make financial gains. For example, when buying foreign moneys, it is judged that the order price is prohibitive only when the start price is lower than the present exchange market price. When selling foreign moneys, it is judged that the order price is prohibitive only when the start price is higher than the present exchange market price. When the order price is judged to be prohibitive (this case corresponds to 'YES' of step S3), an error processing is executed and the order is rejected (see step S10).

In contrast, in the case where the order price is judged to be proper (this case corresponds to 'NO' of step S3), the account information generation unit 15 acquires the margin money information of the customer from the customer account information table 182. The margin money information is calculated from the numerical data stored in the 'amnt' field 182*a* shown in FIG. 2.

The order receiving unit 12 compares the acquired margin money information with the total amount of the order of the customer (see step S4). The total amount of the order is calculated using the input value of the price input field 40*b*, the input value of the price range input field 40*c* and the selected number by the trap number selection field 40*d*. In the case where the amount of the margin money is lower than the total amount of the order (the case corresponds to 'YES' of step S5), an error processing is executed and the order is rejected (see step S10). In other words, the order information generation unit 16 does not generate an order information group when the amount of the margin money is lower than the total amount of the order. Consequently, the limit order by the if-done-order can be received only when the customer can pay.

In the case where the amount of the margin money is higher than the total amount of the order (the case corresponds to 'NO' of step S5), the order receiving unit 12 confirms whether the order condition satisfies the other requirements of the trap trade (see step S6). In this confirmation processing, the order receiving unit 12 firstly acquires the numerical data recorded in the 'trap_range' field 183*a* of FIG. 2C as the value of the minimum price range condition. The value of the minimum price range condition is the value input to the price range input field 40*c*. Next, the order receiving unit 12 acquires the minimum price range information corresponding to the designated currency pair from among the minimum price range information stored in the minimum price range table 184. Then, the order receiving unit 12 compares the value of the minimum price range condition and the minimum price range information, and confirms whether the value of price range input to the price range input field 40*c* is equal to or higher than the minimum price range.

In the case where the input value of the price range input field 40*c* is lower than the value of the minimum price range information (this case corresponds to 'YES' of step S7), the order receiving unit 12 executes an error processing and rejects the receipt of the order (see step S10). Consequently, an increasing of risk caused by approaching of price ranges of two orders can be prevented. Additionally, an increasing of work amount of the financial product caused by concentration of transaction into specified price range can be prevented.

In contrast, in the case where the input value of the price range input field 40*c* is equal to or higher than the value of the minimum price range information (this case corresponds to 'NO' of step S7), the order receiving unit 12 further checks the other requirements. Then, in the case where all requirements are judged to be satisfied (this case corresponds to 'NO' of step S7), the front page transmitting unit 11 makes the display unit 22 of the client terminal 2 to display the confirmation screen 41 shown in FIG. 5B. On the confirmation screen 41, the conditions of the order, which is set by the customer using the first input screen and the second input screen 40, is listed. Moreover, the order button 41*a*, which is used for making the customer to confirm that the listed information is right, is displayed on the confirmation screen 41.

The order button 41*a* is clicked by operating the operation unit 21. When the customer clicks the order button 41*a*, the order information generation unit 16 of the financial product transaction management device 1 generates an order information based on the trade order application information input at step S1 (see step S8). In this order information generation processing, the data input at the above described step S1 are grouped by the order. Moreover, one of sequence number of the sequence number table 184 (see FIG. 1) is assigned to each group. The information for distinguishing between the used number and unused number is written in the sequence number table 184.

The order information generation unit 16 writes the generated order information group in the order table 181 (see step S9). In this writing processing, firstly, the corresponding data are written in the each column shown in FIG. 2A. The order information generation unit 16 specifies the kinds of data written in each column by referencing the information written in the note column 181a. For example, the sequence number assigned at step S8 is written in the 'ord_seq' column 181b. The customer number assigned to the customer is written in the 'cust_seq' column 181c. The name of the product is written in the 'style_id' column 181d. The ID number assigned to the currency pair is written in the 'ccy_pair_id' column 181e. The relationship between the ID number and the currency pair is recorded in the ID table, that is, another table stored in the database. The data indicating the distinction between the selling order and the buying order is written in the 'buy_sell_id' column 181f. The price of the order is written in the 'ord_rate' column 181g. The time limit of the order is written in the 'limit_time' column 181h. The type of the order (for example, the information for distinguishing the type of the order between the market order, the limit order, the stop loss order etc., and the distinction between effectiveness and ineffectiveness of the order) is written in the 'ord_cond' column 181i. The data for distinguishing between the new order and settlement order is written in the 'new_close' column 181j. The sequence number of the if-done-order is written in the 'ifd_ord_seq' column 181k. The information indicating that the repeat-if-done-order has been requested is written in the 'repeat_flag' column 181m.

The processing for forming the limit order of the if-done-order is completed by terminating the processing of the step S9.

FIG. 6 is the conceptual diagram showing the order table 181 after the processing of the step S9. As shown in FIG. 6, plural order information groups are written in the order table 181. In the example of FIG. 6, five order information groups 181s1, 181s2, . . . , 181s5 are written. The order information groups 181s1, 181s2, . . . , 181s5 contain the first orders 181t1, 181t2, . . . , 181t5, the second orders 181u1, 181u2, . . . , 181u5 and the stop loss orders 181v1, 181v2, . . . , 181v5 respectively. In the present embodiment, the first order is the order for buying the predetermined financial product by the limit order at the predetermined price, the second order is the order for selling the financial product, which is bought by the first order, by the limit order at the predetermined price different from the price of the first order, the stop loss order is the order for selling the financial product, which is bought by the first order, by the limit order at the predetermined price different from the prices of the first and second orders. The present embodiment generates the order information groups corresponding to the price range different from each other. The front page transmitting unit 11 makes the display unit 22 of the client terminal 2 to display the picture information similar to the order table 181 shown in FIG. 6. Consequently, the convenience of the customer increases.

Regarding the order information groups 181s1 to 181s5, the first orders 181t1 to 181t5 have the higher priorities of contracts and the second orders 181u1 to 181u5 have the lower priority of contract. So, the first orders 181t1 to 181t5 are written in the order table 181 as effective order information at first. The second orders 181u1 to 181u5 and the stop loss orders 181v1 to 181v5 are written in the order table 181 as ineffective order information at first. As described above, 'effectiveness' of the order means the state that the formed order is placed, so the processing based on the order is in execution. In contrast, 'ineffectiveness' of the order means the state that the formed order is not placed, so the processing based on the order is not in execution.

As described below, the order is switched between the effectiveness and the ineffectiveness in the transaction processing. The order information generation unit 16 writes the switching of effectiveness/ineffectiveness of the order information in the order table 181 one by one. Consequently, the data adjusted to the transaction state of the if-done-order can be generated and written, so the affinity with other application software used in the financial product transaction management device 1 can be increased, furthermore, the distinction between effectiveness and ineffectiveness can be displayed on the display unit 22 in real time.

The price information receiving unit 19 of the financial product transaction management device 1 continues to acquire the information of the exchange after completing the order processing. And the contract information generation unit 14 executes the order of each position when the market price become equal to the order price of the predetermined position.

Figure 4A:
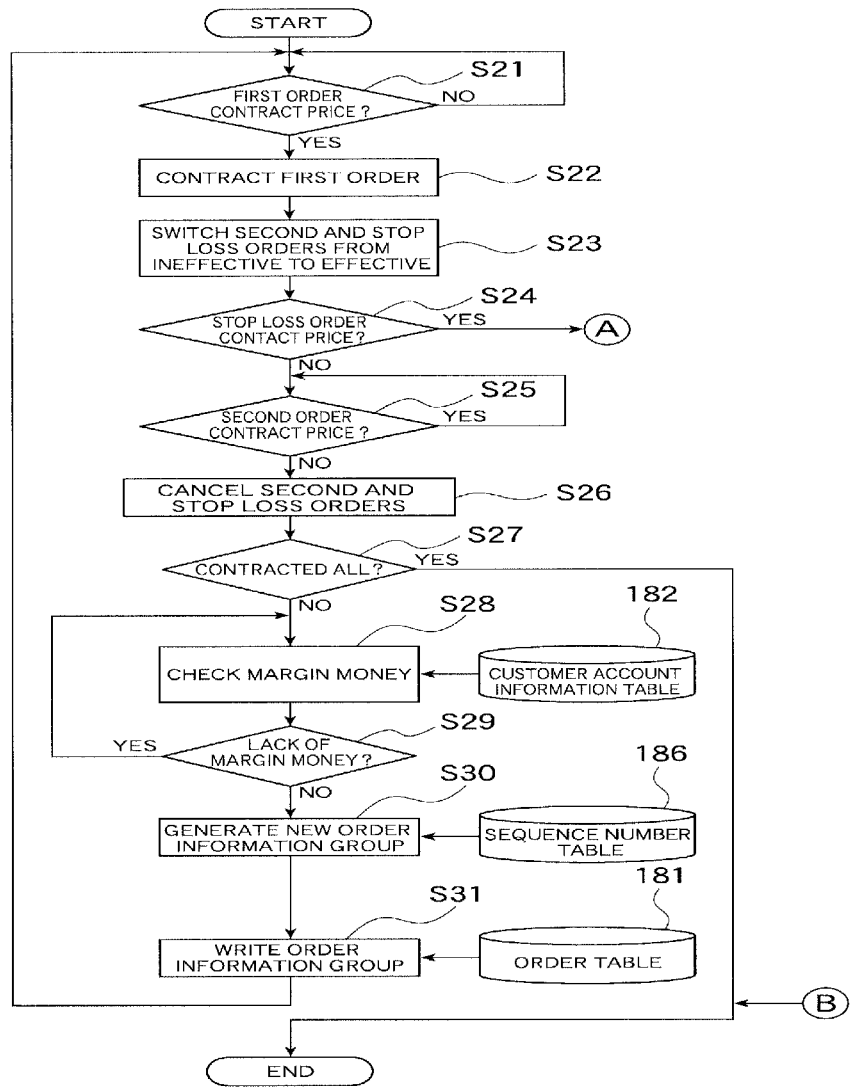
FIG. 4A is a flowchart showing the procedures when the transaction management device shown in FIG. 1 processes the limit order based on the trap-repeat-if-done-order.
Figure 4B:
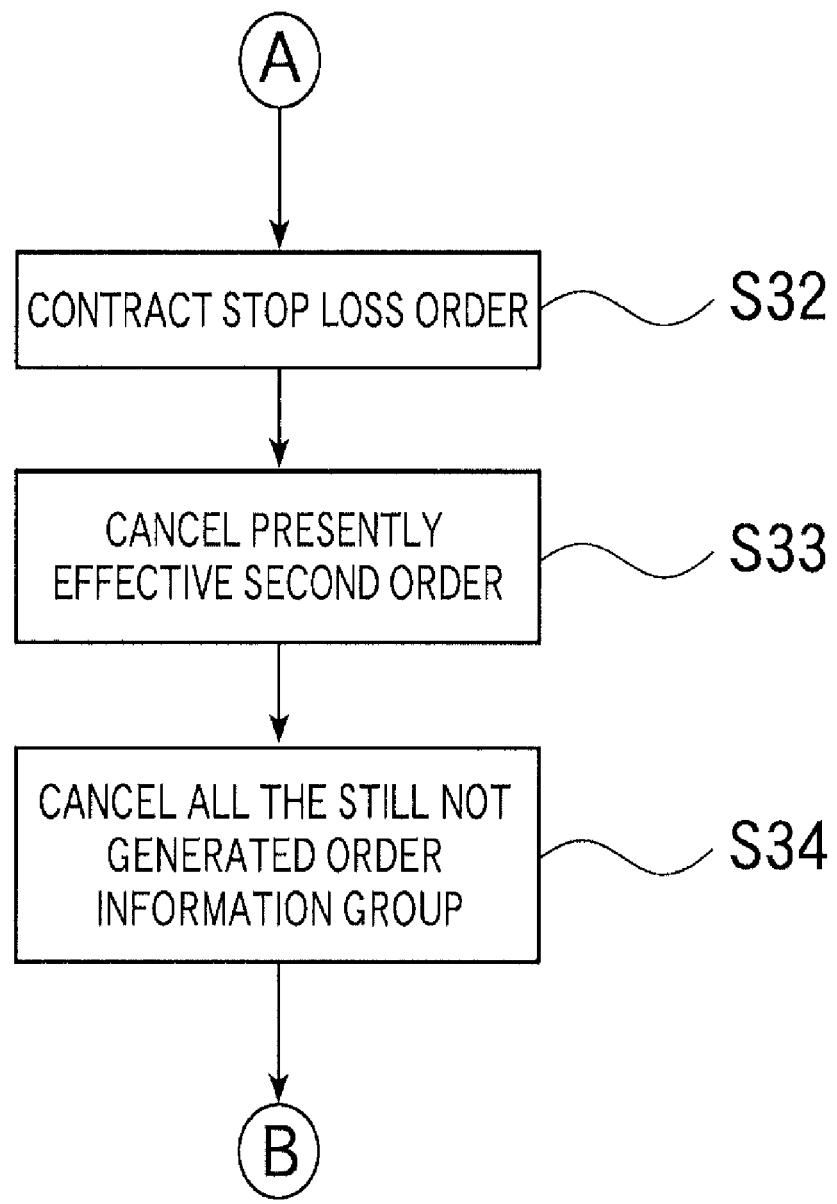
FIG. 4B is a flowchart showing the procedures when the transaction management device shown in FIG. 1 processes the limit order based on the trap-repeat-if-done-order.

FIGS. 4A and 4B are flowcharts indicating the procedures of the financial product transaction management device 1 for processing the limit order based on the trap-repeat-if-done-order. FIG. 7 is a conceptual diagram schematically indicating the procedures of the financial product transaction management device 1 for executing the contract processing of the limit order based on the trap-repeat-if-done-order. Hereinafter, the procedures for processing the trap-repeat-if-done-order are described with referencing these drawings.

In FIG. 7, circles indicate the positions of the order information. The circles drawn by solid lines indicate the effective order information and the circles drawn by dotted lines indicate the ineffective order information. The symbol t1 indicates the time point of completing the limit order processing according to the if-done-order. At the time point t1, the first orders 181t1 to 181t5 are effective order information, also the second orders 181u1 to 181u5 and the stop loss orders 181v1 to 181v5 are ineffective order information.

In the example of FIG. 7, the US dollar's market purchase price 71 at the time point t1 is 108.00 yen per dollar. Afterward, the US dollar's market purchase price 71 falls and, at the time period t2, becomes 107.00 yen per dollar, that is, the same price as the contract price of the first order 181t1 (see step S21). Then, the contract information generation unit 14 executes the processing for contracting the first order 181t1 of the position (see step S22).

When the limit order corresponding to the first order 181t1 is contracted, the contract information generation unit 14 rewrites the corresponding data in the database 18. In this rewriting processing, the data of the order information according to the limit order are deleted from the order table 181. Furthermore, in this rewriting processing, the value according to the contract price and the value according to the contract amount are added to or deducted from the data value of the 'amnt' field 182a of the customer account information table 182.

When the limit order based on the first order 181t1 is contracted, the contract information generation unit 14 switches the second order 181u1 and the stop loss order 181v1 of the corresponding order information group from ineffective order information to the effective order information (see step S23).

After that, the price 71 falls to 106.00 yen, 105.00 yen, 104.00 yen and 103.00 yen, and the processing same as step S21 to S23 are executed at the time points t3, t4, t5 and t6. In other words, the contract information generation unit 14 contracts the limit orders based on the first orders 181t2 to 181t5 one by one, as shown in FIG. 7. Then, the contract information generation unit 14 switches the second orders 181u2 to 181u5 and the stop loss orders 181v2 to 181v5 from ineffective order information to the effective order information, following to these contracts (not shown in FIG. 7).

Thereafter, the US dollar's market purchase price 71 turns to rise without reaching the contract price of the stop loss order 181v1 to 181v5 (i.e. 102.50 yen per dollar in the present embodiment, this case corresponds to 'NO' of step S24). And the market purchase price 72 reaches 103.50 yen (at the time point t7), 104.50 yen (at the time point t9), 105.50 yen (at the time point t11), 106.50 yen (at the time point t13) or 107.50 yen (at the time point t15). Consequently, the contract information generation unit 14 executes the processing of contracting the limit order based on the second orders 181u5 to 181u1 of the position and the processing of canceling the stop loss orders 181v5 to 181v1, as shown in FIG. 7 (see step S26). FIG. 7 shows only the processing according to the stop loss order 181v1. In addition, the contract information generation unit 14 rewrites the corresponding data in the database 18. In this way, the customer can gain the amount of difference between the buying order and the selling order (for example, the amount of difference between the first order 181t1 at the time point t2 and the second order 181u1 at the time point t15) as a profit. Incidentally, the comparing between the market purchase price 72 and the price of the stop loss order can be repeated by returning to step S24 when the US dollar's market purchase price 72 is lower than the price of the second order 51c in FIG. 4A.

As shown in FIG. 7, the second order 181u5 to 181u1 contract at the time point t7, t9, t11, t13 and t15. Shortly afterwards, that is, at time point t8, t10, t12, t14 and t16, it is checked whether contracts of all order information are completed (see step S27). If not completed (this case corresponds to 'NO' of step S27), the account information generation unit 15 acquires the margin money information of the customer from the customer account information table 182 again (see step S28). When the amount of the margin money is lower than the amount of the order (this case corresponds to 'YES' of step S29), the processing is reserved until the amount of the margin money reaches or surpasses the total amount of the order. In contrast, when the amount of the margin money is equal to or over the total amount of the order (this case corresponds to 'NO' of step S29), the order information generation unit 16 generates new order information groups 181s5 to 181s1 one by one (see step S30). In other words, at the time points t8, t10, t12, t14 and t16, the first orders 181t5 to 181t1 are newly generated as the effective order information, and the second orders 181u5 to 181u1 are newly generated as ineffective order information. Additionally, the stop loss order 181v1 is newly generated as ineffective order information at the time point t16. As not shown in FIG. 7, the stop loss orders 181v5 to 181v2 are newly generated as ineffective order information at the time points t8, t10, t12 and t14.

The order information generation unit 16, similar to step 9, stores the generated order information groups 181s5 to 181s1 in the order table 181 one by one (see step S31). Then, the processing from the step S21 is executed again.

Such processing is continued until the order information groups of all positions are generated and the processing of steps S22 and S26 corresponding to the order information groups of all positions are executed (the state corresponds to 'NO' of step S27). Then, processing completes when the processing of step S22 and S27 corresponding to the order information groups of all positions are executed (the state corresponds to 'YES' of step S27).

In the case where the market purchase price 71 is judged to reach the stop order price after the processing of step S23 (this case corresponds to 'YES' of step S24), the contract information generation unit 14 executes the contract of the stop loss order 181v1 (see step S32). In the example of FIG. 7, the market purchase price 71 reaches 102.50 yen per dollar, that is the contract price of the stop loss order 181v1, at the time point t17, and so the contract of the stop loss order is executed. At the step S32, the contract information generation unit 14 executes the contract processing of the stop loss order 181v1 corresponding to the first order 181t1. The loss of customer can be minimized by the contract of the stop loss order, even when the market of the financial product largely changes.

When one of the stop loss order 181v1 to 181v5 is contracted, the contract information generation unit 14 executes the processing for canceling the second order corresponding to the contracted stop loss order 181v1 to 181v5 (see step S33). Then, the contract information generation unit 14 executes the processing for canceling all of order information groups not generated yet at the time the stop loss order is contracted (see step S34). In the example of FIG. 7, the contract information generation unit 14 processes the canceling of the second order which is effective and not contracted at the time point t17 (e.g. the second order 181u1, see step S33), then, cancels all of the order information groups 181s1 to 181s5 not generated yet at the time point t17 in the order information groups 181s1 to 181s5 written in the order table 181 (see step S34). By such cancellation processing, all of the trading can be stopped automatically when one stop loss order is contracted. Consequently, the loss of the customer can be minimized even when the market of the financial product largely changes.

Incidentally, when the client terminal 2 requests the change of the price and the amount of the limit order already formed, the financial product transaction management device 1 judges the request as an illegal request and executes the input error processing. This makes the affairs of the financial product traders (for example, bank etc.) simpler by reducing the requests in connection with the price and the amount.

The client terminal 2 according to the present embodiment can be constructed to receive the cancellation of the order. The cancellation can be received by displaying the third input screen not shown in the drawings, providing an order cancellation button on the screen and making the user to click the button, for example. When the once formed if-done-order is requested to be canceled, the contract information generation unit 14 of the financial product transaction management device 1 extracts the order information group contained in the cancellation requested if-done-order and executes the processing for canceling all of the still not contracted second and stop loss orders among this order information group. For example, in the case where the cancellation is requested between time point t6 and t7 in FIG. 7, the second order 181u5 and the still not contracted stop loss order 181v5 (not shown in FIG. 7) are canceled. The data related to the cancelled order information group and the data related to the canceled order information are deleted from the order table 181.

In this manner, when the once formed if-done-order is requested to be canceled, the order information group contained in the cancellation requested if-done-order is extracted and the processing for canceling all of the still not contracted second and stop loss orders contained in the order information group is executed. Hereby, the processing of the limit order corresponding to the if-done-order can be simplified.

It is possible to execute the cancellation processing of all order information groups of which the transactions are not started, in addition to the cancellation processing of the order information group in execution, when the cancellation is requested. In the above described example, the order information group 181s5, which is not generated at the time point t7 but programmed to be generated aftertime, can be cancelled. Moreover, it is possible to cancel all second orders which are effective but not contracted at the time the cancellation is requested (for example, the second orders 181u4 to 181u1 which are programmed to be contracted at the time point t9, t11, t13 and t15), in response to the cancellation request.

When the client terminal 2 executes the market order, the order information generation unit 16 executes the order information generation processing similar to the steps S1 to S8, after this, the contract information generation unit 14 contracts the order. In other words, in the case of market order, the processing of step S9 and S21 to S34 are not executed.

The financial product transaction management device 1 according to the present embodiment can execute plural kinds of if-done-orders, the price range of which differs each other. In addition, the present embodiment can automatically sell the financial products which are bought by if-done-order. Therefore, the convenience of the customer can increase and the risk of the customer can decrease.

Furthermore, the order information transaction management device 1 of the present embodiment can generate the next order information group when the second order contracts, and can execute plural if-done-orders of different prices. Consequently, according to the present embodiment, the customer can execute plural if-done-orders with simple order procedures. The present embodiment explains the device and program of the present invention based on the example that the present invention is applied to the foreign exchange. However, the present invention can be applied to the dealings of stock, bond or other financial products. Furthermore, the present invention can be applied to the dealings other than the financial product.

The present embodiment is described based on the example that the financial product is bought by the first order, and is sold by the second order or the stop loss order. However, the present invention can be applied to the case where the financial product is sold by the first order, and is bought by the second order or the stop loss order. In this case, the price of the second order is set to be lower than the price of the first order and the price of the stop loss order is set to be higher than the first order.

DESCRIPTIONS OF REFERENCE SYMBOLS

1A: financial product transaction management system
1: financial product transaction management device
2, 21 to 2n; client terminal
12; order input receiving unit (order input receiving means)
14; contract information generation unit (contract information generation means)
181; order table (order information storing means)
181s1, 181s2, ..., 181s5; order information group
181t1, 181t2, ..., 181t5; first order (buying order information)
181u1, 181u2, ..., 181u5; second order (selling order information)
181v1, 181v2, ..., 181v5; stop loss order (stop loss order information)

What is claimed is:

1. A transaction management device, comprising;
an order receiving unit that receives a trade order application information from a client terminal;
an order information generation unit that generates for each received trade order application information plural order information groups, each order information group contains a first order for executing one of buying or selling of a financial product at a first order price, a second order for fixing a profit by selling the financial product bought by the first order at a second order price higher than the first order price or by buying the financial product sold by the first order at the second order price lower than the first order price, and a stop loss order for stopping an increase of loss by selling the financial product bought by the first order at a stop loss order price lower than the first order price or by buying the financial product sold by the first order at the stop loss order price higher than the first order price, and sets the first order price, the second order price and the stop loss order price to different prices in each order information group;
a memory unit that stores the order information groups generated by the order information generation unit; and
a contract information generation unit that executes transaction processing corresponding to the plural order information groups simultaneously, and sets a corresponding first order to an effective status that is an active status for contracting the trade order, a corresponding second order to an ineffective status that is a stand-by status and a corresponding stop loss order to the ineffective status, responsive to start of the transaction processing of a corresponding order information group,
wherein for the plural order information groups:
responsive to a contracted first order, the contract information generation unit switches settings of second and stop loss orders corresponding to the contracted first order from an ineffective status to an effective status,
responsive to a contracted second order, the contract information generation unit cancels a stop loss order corresponding to the contracted second order, checks whether all transactions in connection with the plural order information groups are completed, and starts transaction processing of a next order information group if one or more order information groups from among the plural order information groups in which a transaction is not completed is judged to exist, and
responsive to a contracted stop loss order, the contract information generation unit cancels a second order corresponding to the contracted stop loss order, and cancels transactions in connection with the plural order information groups.

2. The transaction management device according to claim 1, wherein the contract information generation unit newly generates a next order information group corresponding to an order information group of a contracted second order, after a contract or the second order contained in one order information group of the plural order information groups.

3. The transaction management device according to claim 2, wherein the contract information generation unit cancels a subsequent generation of order information groups, after a contract for a stop loss order contained in one order information group of the plural order information groups.

4. The transaction management device according to claim 1, wherein the order information generation unit executes the first order as a new limit order, executes the second order as a settlement limit order and executes the stop loss order as a settlement stop loss order.

5. The transaction management device according to claim 1, wherein the order information generation unit sets a number of generated traded financial products of the plural order information groups generated-based on same trade order application information.

6. The transaction management device according to claim 1, wherein the order information generation unit sets plural first order prices so that ranges of them are uniform and sets plural second order prices so that ranges of them are uniform.

7. The transaction management device according to claim 1, wherein the contract information generation unit extracts an order information group containing order information corresponding to an order to which a cancellation is requested and cancels order information contained in the extracted order information group before a contract, responsive to a cancellation request to an order of the financial product previously formed.

8. The transaction management device according to claim 1, wherein the financial product is a foreign exchange.

9. A non-transitory computer-readable storage medium having recorded thereon a computer program for causing a computer to operate as a transaction management device, the computer program comprising code segments of executing:

receiving a trade order application information;

generating for each received trade order application information plural order information groups, each of which contains a first order for executing one of buying or selling of a financial product at a first order price, a second order for fixing a profit by selling the financial product bought by the first order at a second order price higher than the first order price or by buying the financial product sold by the first order at the second order price lower than the first order price and a stop loss order for stopping at an increase of loss by selling the financial product bought by the first order at a stop loss order price lower than the first order price or by buying the financial product self by the first order at the stop loss order price higher than the first order price, and setting the first order price, the second order price and the stop loss order price to different prices in each order information group; and executing transaction processing corresponding to the plural order information groups simultaneously, and setting a corresponding first order to an effective status that is an active status for contracting the trade order, a corresponding second order to an ineffective status that is a stand-by status and a corresponding stop loss order to the ineffective status responsive to start of the transaction processing of a corresponding order information group, wherein for the plural order information groups:

switching settings of second and stop loss orders corresponding to a contracted first order from an ineffectiveness status to an effectiveness status, responsive to a contracted first order, cancelling a stop loss order corresponding to a contracted second order, checking whether all transactions in connection with the plural order information groups are completed, and starting transaction processing of a next order information group if one or more order information groups from among the plural order information groups in which a transaction is not completed is judged to exist, and cancelling a second order corresponding to a contracted stop loss order, and cancelling transactions in connection with the plural order information groups, responsive to a contracted stop loss order.

\* \* \* \* \*

UNITED STATES PATENT AND TRADEMARK OFFICE
CERTIFICATE OF CORRECTION

PATENT NO. : 8,296,219 B2
APPLICATION NO. : 12/810077
DATED : October 23, 2012
INVENTOR(S) : Hisatoshi Yamamoto et al.

It is certified that error appears in the above-identified patent and that said Letters Patent is hereby corrected as shown below:

In the Claims:

Column 16, Line 62, In Claim 5, "generated-based" should be changed to --based--.

Signed and Sealed this
Twenty-eighth Day of May, 2013

Teresa Stanek Rea
*Acting Director of the United States Patent and Trademark Office*